US006418796B1

United States Patent
Baumoel

(10) Patent No.: US 6,418,796 B1
(45) Date of Patent: Jul. 16, 2002

(54) SONIC FLOW MEASUREMENT APPARATUS FOR TUBES INCLUDING SONICALLY MATCHED PLATES

(76) Inventor: Joseph Baumoel, 104 Fairway View Dr. The Hamlet, Commack, NY (US) 11725

( * ) Notice: Subject to any disclaimer, the term of this patent is extended or adjusted under 35 U.S.C. 154(b) by 0 days.

(21) Appl. No.: 09/566,411

(22) Filed: May 8, 2000

Related U.S. Application Data

(60) Provisional application No. 60/132,757, filed on May 6, 1999.

(51) Int. Cl.[7] ................................................ G01F 1/66
(52) U.S. Cl. ................................. 73/861.28; 73/861.27
(58) Field of Search ......................... 73/861.28, 861.27, 73/861.29, 861.31

(56) References Cited

U.S. PATENT DOCUMENTS 5,179,862 A * 1/1993 Lynnworth ............... 73/861.28
5,728,948 A * 3/1998 Bignell et al. ........... 73/861.28

* cited by examiner

Primary Examiner—Benjamin R. Fuller
Assistant Examiner—Corey D. Mack
(74) Attorney, Agent, or Firm—F. Chau & Associates, LLP

(57) ABSTRACT

The present invention includes a clamp-on housing for encapsulating or confining a flexible tube or pipe. The housing includes transducers therein for transmitting and receiving sonic energy. A sonically matched plate is provided to function as a waveguide for the sonic energy to form a coherent wide beam such that flow characteristics may be measured in the flexible tube. An apparatus for measuring flow in flexible tubes, in accordance with the present invention, includes a housing including a first portion configured and dimensioned for receiving a first transducer and a second transducer therein and a second portion adapted to attach to the first portion to encapsulate a flexible tube between the first and second portion without cutting off flow within the tube. A plate is disposed within the housing in contact with the tube. The plate is sonically matched to the transducers to permit sonic energy transmitted from the first transducer to travel along the plate to provide sonic radiation from the plate to be received by the second transducer to measure flow characteristics within the tube.

18 Claims, 4 Drawing Sheets

SONIC FLOW MEASUREMENT APPARATUS FOR TUBES INCLUDING SONICALLY MATCHED PLATES

CROSS REFERENCE TO RELATED APPLICATION

This application claims priority to Provisional Application Ser. No. 60/132,757 filed May 6, 1999.

BACKGROUND

1. Field of the Invention

This disclosure relates to flow measurements and, more particularly, to sonic flow measurement devices for flexible vessels.

2. Description of the Related Art

All metallic pipes may be considered sonic waveguides. This means that there is a mode of transmission of sonic energy, which preserves the relationship between Group and Phase velocities as sonic energy is transmitted down a pipe wall.

A transducer may be attached to a pipe such that the Phase velocity of sonic energy produced by the transducer is matched to a shear mode propagation velocity of the pipe material, and the transducer is operated at a frequency dependent on the round trip echo time in the radial direction. This will result in radiation of a coherent sonic wave into a liquid contained within the pipe at a constant angle to the pipe axis as the energy travels down the pipe. The sine of this angle is dependent, by Snell's law, on the sonic propagation velocity of the liquid and the propagation velocity of the sonic energy down the wall of the pipe, since that energy travels axially, rather than at an angle within the pipe wall.

Since most non-metallic materials, such as plastics, do not support or only marginally support shear waves, pipes and tubes made of these materials do not typically exhibit waveguide properties. Accordingly, if sonic measurements are to be taken, it is not necessary for a sonic transducer to exhibit any particular Phase velocity or frequency to optimize the coherency of the liquid sonic beam. Unfortunately, the sonic impedance of plastic and other non-metallic materials are typically close to the impedance of most liquids. This is unlike metallic pipes in which the impedance is much higher than liquids. In sonic flow measurement systems, this results in a receive transducer obtaining sonic energy reflected from both the inner and outer pipe wall when operated with reflect mode transducers, which are desirable for crossflow correction. This reflection distorts the sonic signal with consequent miscalibration effects.

An additional problem presents itself when operating on plastic tubes, rather than metallic tubes. When operating on metallic tubes, a waveguide matched transducer may be excited to a waveguide mode of the tube or pipe at a location of a transmit transducer. This results in the injection of a Wide Beam signal, (i.e., waveguide matched), even though a limited aperture of the transmit transducer actually produces energy which is not, at the edges of the injection footprint, at a different phase velocity.

When clamped to a plastic pipe, however, these edges are not discriminated against. This results in the receive signal obtaining sonic signals that travel at a variety of angles in the liquid. The resultant multipath signals, each arrive at the receive transducer at a slightly different time, and cause further distortion and calibration instability.

Therefore, a need exists for an apparatus for accurately measuring flow in flexible vessels, such as plastic or rubber tubes and pipes.

SUMMARY OF THE INVENTION

An apparatus for measuring flow in flexible tubes, in accordance with the present invention, includes a housing including a first portion configured and dimensioned for receiving a first transducer and a second transducer therein and a second portion adapted to attach to the first portion to encapsulate a flexible tube between the first and second portion without cutting off flow within the tube. A plate is disposed within the housing in contact with the tube. The plate is sonically matched to the transducers to permit sonic energy transmitted from the first transducer to travel along the plate to provide sonic radiation from the plate to be received by the second transducer to measure flow characteristics within the tube.

In other embodiments, the first and second transducers may be disposed on a same side of the tube to operate in a reflect mode. A second sonically matched plate may be disposed on the same side of the tube as the first and second transducers to carry Sonically transmitted signals through the second plate to provide a reference signal.

These and other objects, features and advantages of the present invention will become apparent from the following detailed description of illustrative embodiments thereof, which is to be read in connection with the accompanying drawings.

BRIEF DESCRIPTION OF DRAWINGS

The invention will be described in detail in the following description of preferred embodiments with reference to the following figures wherein.

DETAILED DESCRIPTION OF PREFERRED EMBODIMENTS

The present invention relates to flow measurements and, more particularly, to sonic flow measurement devices for flexible vessels. The present invention includes an apparatus for measuring flow in flexible vessels such as tubes and pipes. The present invention encapsulates or confines a portion of the flexible vessel to maintain contact with the vessel and to fix the geometry of the flexible vessel. The present invention employs sonic energy propagated through the flexible vessel wall and into the fluid stream within the flexible vessel using transducers. The sonic energy that passes through the far wall of the flexible tube is incident on a sonically matched surface which permits the sonic energy to travel along the sonically matched plate. This, in turn, produces a wide beam as the sonic energy travels along the sonically matched plate. The wide beam is reinjected into the liquid and is received by another transducer downstream of the propagation area of the sonic energy on the same side of the flex tube at the first transducer. An echo time can be measured which results in the flow parameters of the fluid being determined.

Figure 1:
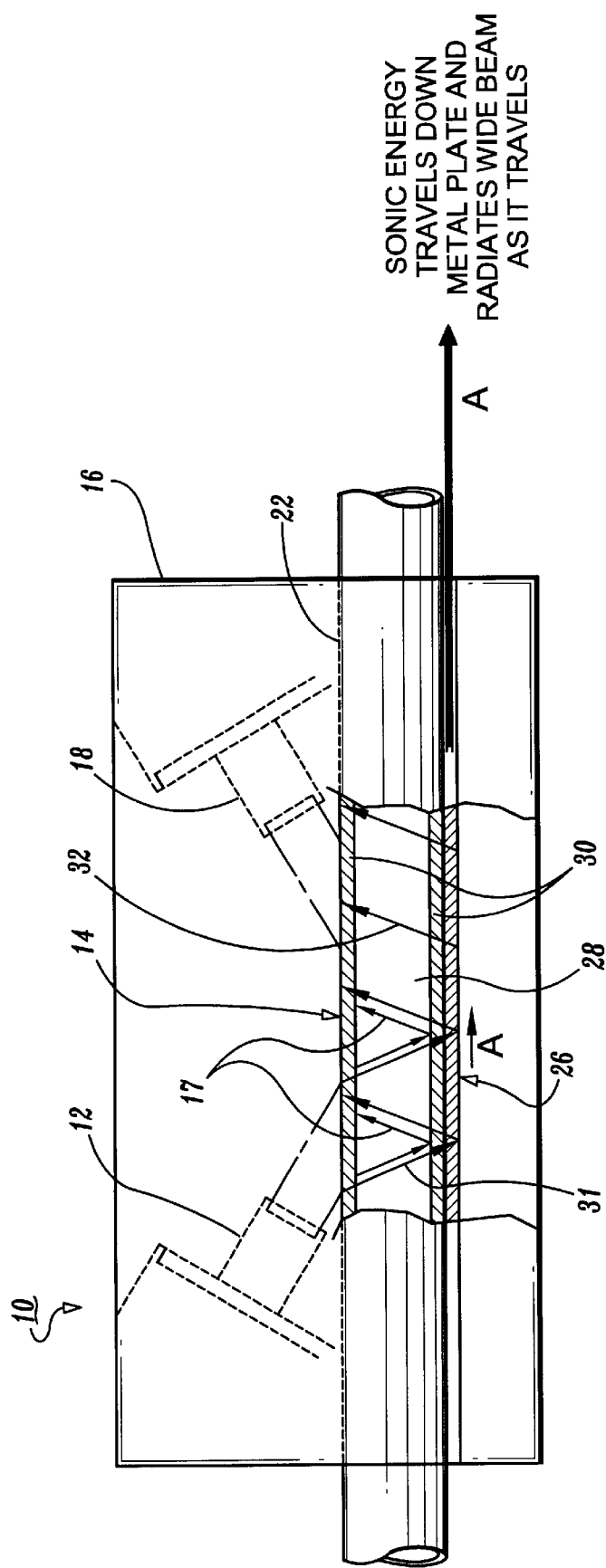
FIG. 1 is partial cross-sectional view of a housing showing aspects of an apparatus for measuring flow in flexible vessels in accordance with the present invention.

Referring now in specific detail to the drawings in which like reference numerals identify similar or identical elements throughout the several views, and initially to FIG. 1, an apparatus 10 in accordance with the present invention is shown. A transducer 12, described in more detail below and in U.S. Pat. No. 4,425,803 incorporated herein by reference, produces a signal that meets the criteria for phase detection and phase correlation as described in U.S. Pat. No. 5,117, 698, incorporated herein by reference. Transducer 12 contacts a flexible tube or pipe 14 to produce a sonic wave therein for measuring flow within tube 14. Since tube 14 is flexible, it is necessary to encapsulate or restrict the volume of tube 14. This assures the dimensions of tube 14 for flowrate computation purposes as well as for sonic transmission as will be described. Tube 14 is encapsulated in a housing 16. Housing 16 includes mounting positions for at least two transducers, i.e., transducer 12 and transducer 18.

Figure 3:
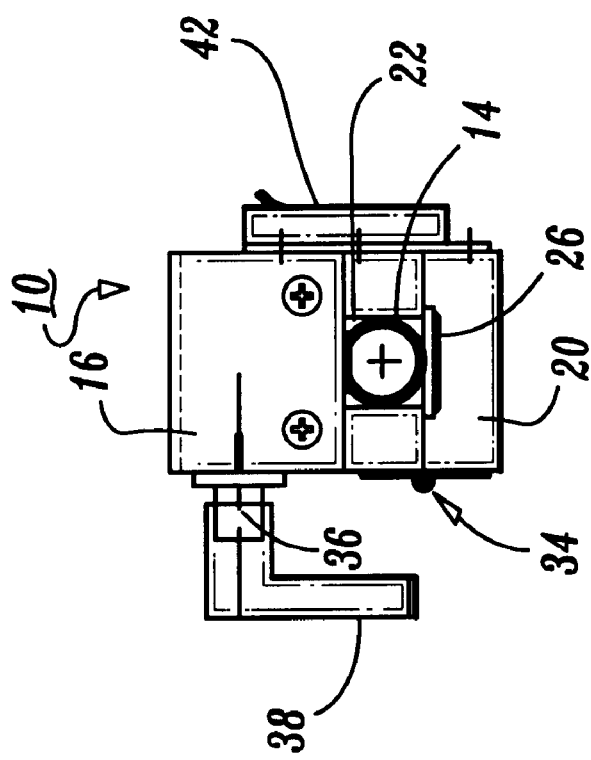
FIG. 3 is a side view of a housing showing a flexible tube in cross-section with a cover in a closed position in accordance with the present invention.
Figure 2:
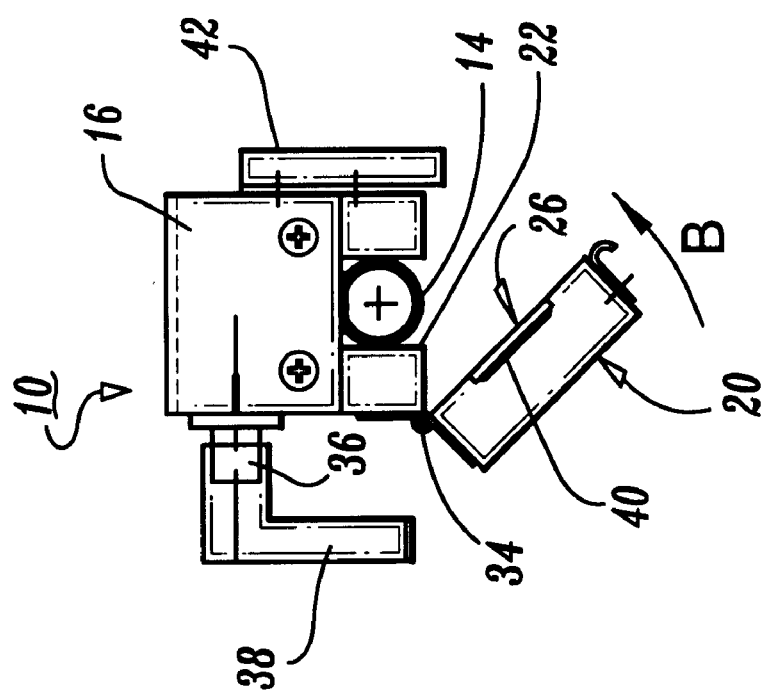
FIG. 2 is a side view of a housing showing a flexible tube in cross-section with a cover in an open position in accordance with the present invention.

Housing 16 may include a clam shell design as shown in FIGS. 2 and 3 where a cover 20 is hingedly connected to housing 16. Alternately, housing may include a split half design or other design which may be placed on a mid-section of a tube. To accommodate the various tube sizes, transducers may be adjustable in tube diameter increments and/or and may be biased to compress tube 14. As shown in FIG. 1, housing 16 includes a slot 22 and cover 20, which when closed, fixes the axial and normal dimensions of tube 14 to conform to the slot dimensions.

In a preferred embodiment, slot 22 (see FIG. 2) dimensions may be adjusted to accommodate different tube sizes. It is expected that slot 22 may be slightly smaller than tube 14 so as to compress tube 14 to conform the dimensions thereof. Dependent on wall thickness of tube 14, the area of the interior of tube 14 will be known, and taken into account for flow computations. Other pertinent information includes tube material, nominal diameter and wall thickness. This information is taken into account in the computation of flow from transit-time information obtained from the transducers, as is described below.

Transducer 12 is a transmit transducer which propagates the sonic energy in the fluid stream. Transducer 18 is a receive transducer which receives the propagated sonic energy (e.g., wide beam) further along tube 14. The roles of transducers 12 and 18 may be switched, i.e., the receive transducer becomes the transmit transducer and vice versa. The receive transducer may be placed directly across tube 14 from the transmit transducer, (direct mode), or positioned to receive a reflected signal, (reflect mode) as depicted in FIG. 1.

In direct mode, the receive transducer will not have to deal with multipath signals which are produced due to signal reflection from both the inner and outer pipe walls, as described above. This mode may be used only when poor sonic transmission of a tube wall minimizes a reflect mode signal excessively.

A preferred embodiment of the present invention employs reflect mode operation as shown in FIG. 1. A sonically matched plate 26 is included oppositely disposed relative to the placement position of transducers 12 and 18. In one embodiment, sonically matched plate 26 includes a metal plate or other material capable of reflecting sonic waves. Sonically matched plate 26 is placed in contact with a wall of tube 14. Sonically matched plate 26 has the material, wall thickness and waveguide velocity which matches the frequency and phase velocity of transducers 12 and 18 (hence, sonically matched).

Accordingly, when a sonic wave 31, which passes through a fluid 28 from the transmit transducer (transducer 12 in this case), also passes through walls 30 of tube 14 and onto plate 26, the waveguide properties of plate 26 are excited. Sonic energy travels down plate 26 in the direction of arrow "A". This results in the re-transmission of sonic energy with full coherency as if the sonic signal was originating in a metallic pipe, rather than a flexible tube.

The result of the present invention is that a coherent signal 32 originating from an outer wall of tube 14 has much more amplitude than any of the other signals, say, reflected from an inner wall, or having a phase velocity different from the waveguide properties of plate 26. Advantageously, edge waves radiated from the transmit transducer due to its non-infinite aperture are also discriminated against, i.e., the coherent signal is recognizable over edge waves due to end effects of the transmit transducer. Accordingly, the receive signal exhibits singlepath, rather than multipath, characteristics, that are of excellent shape, coherency and low resonance.

Another aspect of the present invention is that the Wide Beam generated by sonic energy (32) flowing in sonically matched plate 26 retains its coherency regardless of the sonic propagation of the fluid. Typically, the sonic propagation of fluid in tube 14 may vary with chemical or physical properties of the fluid as well as the temperature of the fluid. The present invention will act as if a flexible tube, for example, plastic, rubber, etc., was a liner within a metallic pipe wall. Computing flow for the present invention may be performed using a computer or data acquisition device. The computer or data acquisition device retains its calibration accuracy and sonic waveshape even as a liquid sonic beam angle varies with the sonic propagation velocity of the fluid.

Receive transducer 18 may be spaced apart sufficiently from transmit transducer 12 such that an initial reflection 17 of the transmitted ultrasound is not directed to receiver transducer-18. In this way, the internal reflections of the flexible tube 14 are sufficiently attenuated and have little influence on the measured signal.

Referring to FIGS. 2 and 3, a particularly useful embodiment of apparatus 10 is shown. Apparatus 10 includes housing 16 with cover 20 attached by a hinge 34. A cable connection 36 is provided for powering transducers 12 and 18 (FIG. 1) and transmitting signals for calculating flow measurements. Flow measurements may include echo times or other information used in determining fluid velocity and flow rate. Other signals may also be transmitted. The transmitted signals are preferably received by a computer or data acquisition device (not shown) through cable 38 to be processed or stored to be processed at a later time.

A flexible tube 14 is placed within slot 22. Cover 20 is then rotated in the direction of arrow "B" to close cover 20 and encapsulate tube 14. Cover 20 includes a recess 40 for mounting sonically matched plate 26. Sonically matched plate 26 is brought into contact with tube 14 by closing cover 20, and sonically matched plate 26 is locked in place using a latch 42 or other locking device to maintain cover 20 is a closed position. Sonic flow measurements may now be made for fluids flowing in tube 14.

It should be understood that the present invention has a wide range of applications. For example, non-metallic tubes or pipes are used in a variety of application where metallic pipes are not suitable, for instance, in the medical arts where sterilization is important, in the food industry, sanitation, pharmaceutical or other industries or application. The present invention is a likely candidate for installation into machines made by others for measurement and control of fluid flow as may be required by their device. Accordingly, it is intended that there be many embodiments, each configured for the benefit of a special purpose device. The "clamshell" embodiment may be modified accordingly. In some cases direct mode transmission may be needed, and in others reflect mode.

Figure 4:
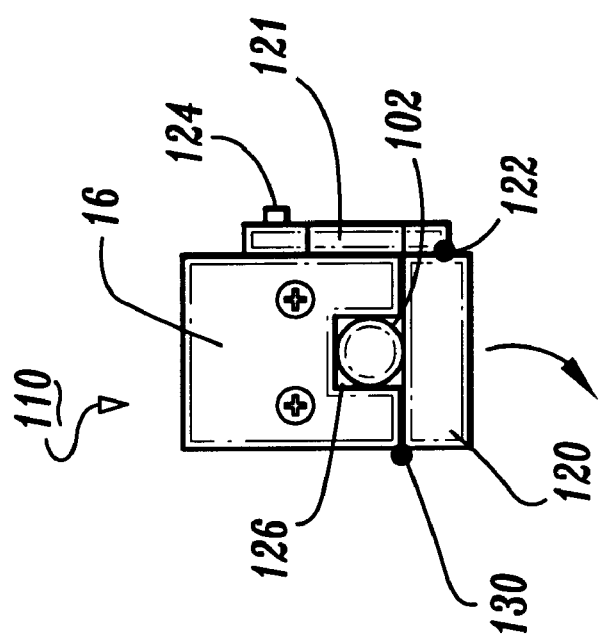
FIG. 4 is a side view of a housing showing a rigid tube in cross-section with a cover in a closed position and the pipe being held by a biasing means in accordance with the present invention.

Referring to FIG. 4, the present invention may be applied to rigid pipes 102 such as thin metal pipes, glass pipes or other pipes in the form of a removable apparatus 110. Cover 120 is biased using a biasing means 121 which may include a coil spring, rubber band or a similar device made of an elastic material which is hingedly attached to cover 120. A latch 124 is provided to capture biasing means 121. Alternately, the latch 124 may be placed on cover 120 and biasing means 121 may be hingedly attached to housing 16. In operation, biasing means 121 is released from latch 124 to open cover 120 to install or remove pipe 102 from apparatus 110. Cover 120 may be made from a compliant material to prevent damage to pipe in closing cover 120. In alternate embodiments, hinge 130 may be omitted and replaced by a biasing means 121 and a latch 124 such that installation and removal is performed by securing both sides of cover 120 with two or more biasing means 121 and latches 124.

Figure 5:
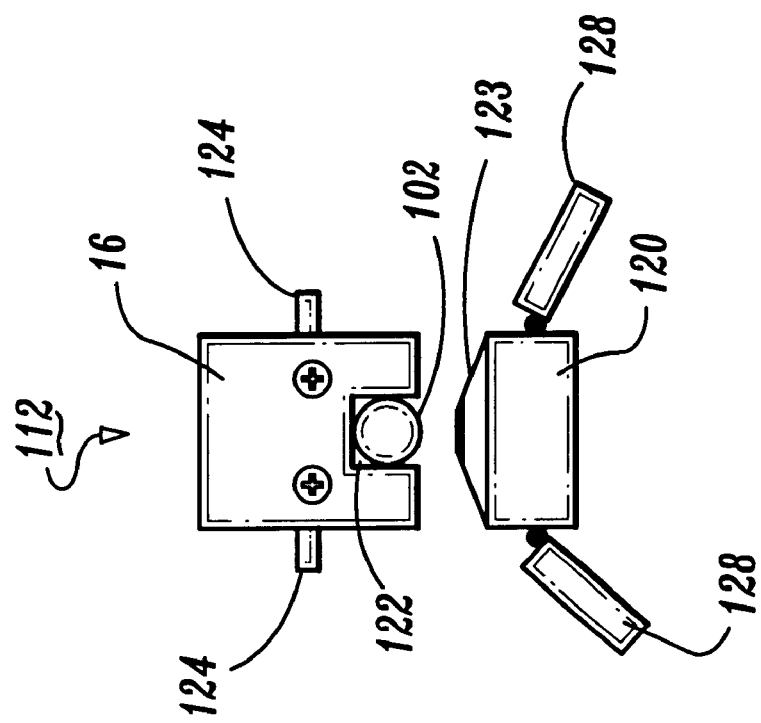
FIG. 5 is a side view of a housing showing a rigid tube in cross-section with a cover in an open position after releasing the cover from biasing the pipe in accordance with the present invention.

Referring to FIG. 5, another embodiment of the present invention may be applied to rigid pipes 102 such as thin metal pipes, glass pipes or other pipes in the form of a removable apparatus 112. Cover 120 is biased using a biasing means 123 which may include a leaf spring, Belleville spring or a similar device which is attached to cover 120. Latches 124 are provided to capture arms 128 which are hingedly attached to cover 120. Alternately, the latches 124 may be placed on cover 120 and arms 128 may be hingedly attached to housing 16. In operation, arms 128 are released from latches 124 to open cover 120 to install or remove pipe 102 from apparatus 112. In an alternate embodiment, cover 120 may be made from a compliant material with a raised portion of the cover as a biasing means 123 to prevent damage to pipe in closing cover 120 to thereby secure pipe 102.

In FIGS. 4 and 5, slot 122 is dimensioned and configured to receive the rigid pipe 102. Cover 120 is then closed to secure the pipe 102 in place. Since the pipe is rigid a matched plate 26 is no longer needed as the pipe itself can provide needed reflections to measure flow therein. Apparatus 110 and apparatus 112, may also be used with a matched plate 26 for flexible tubes or pipes as described above.

Figure 6:
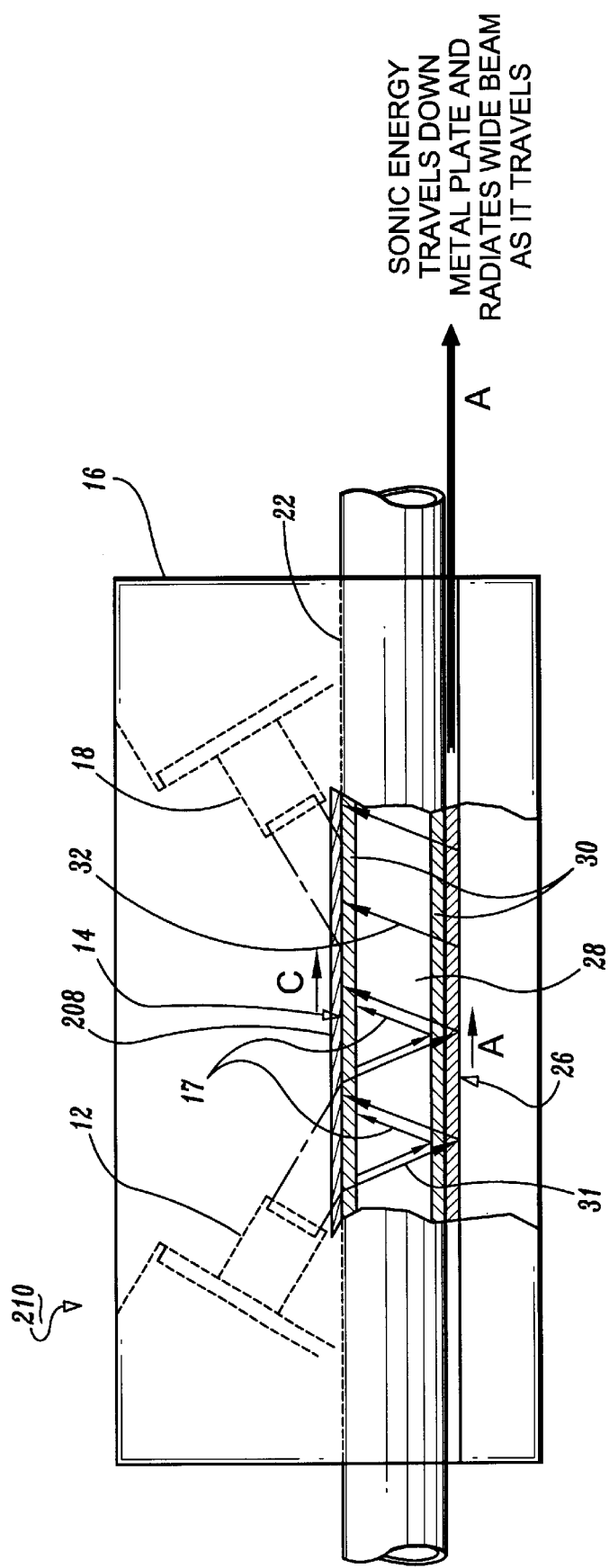
FIG. 6 is partial cross-sectional view of another embodiment of an apparatus for measuring flow in flexible vessels in accordance with the present invention.

Referring to FIG. 6, an apparatus 210 in accordance with another embodiment of the present invention is shown. Apparatus 210 includes a plate 208 on a same side of transducers 12 and 18. Transducer 12 contacts plate 208 to produce a sonic wave therein for measuring flow within tube 14. Ultrasonic energy from transducer 12 not only travels in tube 14 and the fluid flowing thereon, but travels in plate 208 in the direction of arrow "C". Plate 208 functions as a beam splitter, permitting some sonic energy to flow into tube 14 and through the fluid therein and some sonic energy travels in plate 208. Plate 208 preferably includes the properties described for plate 26 (e.g., sonically matched, etc.). The sonic signal traveling along plate 208 may be employed as a built-in reference signal. This signal may be employed to zero out noise, temperature effects or any other discrepancies encountered during flow characteristic measurements. The signal traveling down plate 208 is a high velocity, short path signal that does not travel through the fluid of tube 14. This enables independent viewing of the transmitted ultrasonic signal.

For example, if one of transducers 12 or 18 is subjected to a higher temperature than the other transducer, zero drift may be experienced when comparing the transmitted and received signals. That is, a higher or lower flow may erroneously be measured. This error may be zeroed out by employing the sonic energy (signal) in plate 208 as a reference. This makes the ultrasonic measurements very robust and highly reliable by eliminating detrimental effects which may cause error in the measurements. The embodiment described with reference to FIG. 6 may be employed with or without plate 26. Plate 208 may be employed in any ultrasonic system where a reference signal would be useful.

Having described preferred embodiments of an apparatus for sonic flow measurements for flexible vessels (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed is:

1. An apparatus for measuring flow in flexible tubes comprising:
   a housing including:
      a first portion configured and dimensioned for receiving a first transducer and a second transducer therein;
      a second portion adapted to attach to the first portion to encapsulate a flexible tube between the first and second portion without cutting off flow within the tube;
      a plate attached to the second portion and disposed within the housing in contact with the tube, the plate being sonically matched to the transducers to permit sonic energy transmitted from the first transducer to travel along the plate to provide sonic radiation from the plate to be received by the second transducer to measure flow characteristics within the tube; and
      a second sonically matched plate attached to the first portion and disposed on the same side of the tube as the first and second transducers to carry sonically transmitted signals through the second plate to provide a reference signal.

2. The apparatus as recited in claim 1, wherein the second portion of the housing includes a cover hingedly attached to the first portion of the housing.

3. The apparatus as recited in claim 1, wherein the first portion and second portion of the housing are biased to maintain pressure on the tube to constrict a volume of the tube.

4. The apparatus as recited in claim 1, wherein the first and second transducers are disposed on a same side of the tube to operate in a reflect mode.

5. The apparatus as recited in claim 1, wherein the tube is plastic.

6. The apparatus of claim 1, wherein the sonic energy transmitted from the first transducer is a wide beam radiation.

7. An apparatus for measuring flow in tubes comprising:
- a housing including:
  - a first portion configured and dimensioned for receiving a first transducer and a second transducer therein;
  - a second portion adapted to attach to the first portion to encapsulate a flexible tube between the first and second portion;
  - a plate attached to the second portion and disposed within the housing, the plate extending directly between the first and second transducers and disposed in contact with the tube, the plate being sonically matched to the transducers to permit sonic energy transmitted from the first transducer to travel along the plate to provide a reference signal to the second transducer; and
  - a second sonically matched plate attached to the first portion and disposed on the same side of the tube as the first and second transducers to carry sonically transmitted signals through the second plate to provide a reference signal.

8. The apparatus as recited in claim 7, wherein the second portion of the housing includes a cover hingedly attached to the first portion of the housing.

9. The apparatus as recited in claim 7, wherein the first portion and second portion of the housing are biased to maintain pressure on the tube to constrict a volume of the tube without cutting off flow within the tube.

10. The apparatus as recited in claim 7, wherein the first and second transducers are disposed on a same side of the tube to operate in a reflect mode.

11. The apparatus as recited in claim 7, wherein the tube is plastic.

12. The apparatus as recited in claim 7, wherein the external factors include temperature differences between the first and second transducers and noise.

13. The apparatus of claim 7, wherein the sonic energy received by the second transducer is a wide beam radiation.

14. An apparatus for measuring flow in flexible tubes comprising:
- a housing including:
  - a first portion configured and dimensions for receiving a first transducer and a second transducer therein;
  - a second portion hingedly attached to the first portion to encapsulate a flexible tube between the first and second portion without cutting off flow within the tube, the first and second transducers being disposed on a first side of the tube; and
- a first plate attached to the second portion and disposed within the housing opposite the first side and in contact with the tube, the plate being sonically matched to the transducers to permit sonic energy transmitted from the first transducer to travel along the first plate to provide sonic radiation from the first plate to be received by the second transducer to measure flow characteristics within the tube; and
- a second plate attached to the first portion and disposed within the housing on the first side of the tube, the second plate extending directly between the first and second transducers and in contact with the tube, the second plate being sonically matched to the transducers to permit sonic energy transmitted from the first transducer to travel along the second plate to provide a reference signal to the second transducer such that errors due to external factors are eliminated when measuring flow characteristics.

15. The apparatus as recited in claim 14, wherein the first portion and second portion of the housing are biased to maintain pressure on the tube to constrict a volume of the tube.

16. The apparatus as recited in claim 14, the tube is plastic.

17. The apparatus as recited in claim 14, wherein the external factors include temperature differences between the first and second transducers and noise.

18. The apparatus of claim 14, wherein the sonic energy received by the second transducer is a wide beam radiation.

* * * * *